(12) United States Patent
Wadia et al.

(10) Patent No.: US 6,561,760 B2
(45) Date of Patent: May 13, 2003

(54) BOOSTER COMPRESSOR DEICER

(75) Inventors: Aspi Rustom Wadia, Loveland, OH (US); Kenneth Edward Seitzer, Wyoming, OH (US); Harjit Singh Hura, Cincinnati, OH (US); Frank Worthoff, West Chester, OH (US); Raymond Gust Holm, Lebanon, OH (US); Eric Pierre Masse, West Chester, OH (US); Jason Corey Slagle, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/932,595

(22) Filed: Aug. 17, 2001

(65) Prior Publication Data

US 2003/0035719 A1 Feb. 20, 2003

(51) Int. Cl.[7] ............................................... F01D 25/10
(52) U.S. Cl. ...................... 415/145; 415/176; 60/39.093
(58) Field of Search ................................. 415/115, 116, 415/144, 145, 176, 177, 178; 60/39.093

(56) References Cited

U.S. PATENT DOCUMENTS 4,860,534 A * 8/1989 Easley et al. ......... 60/39.093 X

FOREIGN PATENT DOCUMENTS

| GB | 2038425 A | * | 7/1980 | .............. F02C/7/04 |
| GB | 2136880 A | * | 9/1984 | ......... F02C/07/047 |

OTHER PUBLICATIONS

GE Aircraft Engines, "GE 90 Engine, Fan & Booster," production use in USA more than one year, single figure.

GE Aircraft Engines, GE 90 Engine Manual, page 334, May 1, 2000.

GE Aircraft Engines, "Front Frame & Fan," production use in USA more than one year, single figure.

* cited by examiner

*Primary Examiner*—Edward K. Look
*Assistant Examiner*—Richard A. Edgar
(74) *Attorney, Agent, or Firm*—Nathan D. Herkamp; Francis L. Conte

(57) ABSTRACT

A booster compressor includes inlet guide vanes supported from a shroud. A shell surrounds the shroud and defines a manifold. A splitter nose includes a groove receiving a forward tang of the shroud with a clearance therebetween defining an outlet for the manifold. Hot air is channeled through the manifold and out the splitter nose for deicing thereof.

29 Claims, 3 Drawing Sheets

BOOSTER COMPRESSOR DEICER

BACKGROUND OF THE INVENTION

The present invention relates generally to gas turbine engines, and, more specifically, to deicing therein.

Turbofan aircraft gas turbine engines are configured for powering an aircraft in flight from takeoff, cruise at altitude, descent, and landing in various weather conditions. Since the temperature of operation varies substantially and includes below-freezing temperatures, the engine is subject to inlet icing conditions.

Humid air and rain may enter an engine in freezing conditions and may deposit as layers of ice on internal components of the engine. For example, in icing operating conditions ice may accumulate on fan blades, inlet guide vanes (IGVs) of the booster compressor, annular splitter between the booster compressor and the fan bypass duct, and along outlet guide vanes (OGVs) of the fan bypass duct. Since the splitter diverts flow into the booster compressor and the fan bypass duct, it is subject to a substantial amount of ice accumulation in specific icing conditions.

Since icing changes the aerodynamic profiles of the components being iced, the aerodynamic performance of the engine is adversely affected. And, liberated ice may be ingested through the booster compressor and additionally affect performance.

Ice accumulation is conventionally accommodated by configuring affected compressor airfoils with an increase in ruggedness to avoid or minimize damage from ice liberation. And, engine operability performance may be corrected by raising flight idle or ground idle speeds without violating corresponding thrust constraints.

However, in designing turbofan aircraft engines with even higher bypass ratios, the engine operability issues become more severe than previously encountered since more engine airflow will correspondingly increase the amount of ice accumulation which must be accommodated.

Furthermore, ever larger fan blades are being designed with state of the art composite materials and operate at slower rotational speeds. Slow fan speed permits more accumulation of ice in the specific icing conditions, which ice is shed at correspondingly higher rotational speed and increases ice damage potential of the downstream compressor components.

In one type of low bypass ratio military engine used in this country for many years, ice accumulation is reduced by providing hot compressor bleed air suitably channeled radially through fan front frame struts disposed in front of corresponding variable inlet guide vanes (VIGVs) in front of the first stage fan blades. The hot compressor air heats the front struts for deicing thereof when required in the flight envelope, which struts are otherwise unheated during the remainder of flight envelope operation.

However, strut heating requires substantially larger or thicker struts for channeling the hot bleed air therethrough, and significantly decreases the aerodynamic performance of the engine. Engine airfoil components such as the front frame struts are designed with specific aerodynamic profiles. Those profiles should be as small and thin as possible for maximizing aerodynamic performance, yet internal heating thereof requires the struts to be hollow and thicker than they otherwise would.

Accordingly, it is desired to provide a turbofan high bypass gas turbine engine with deicing capability for the booster compressor.

BRIEF SUMMARY OF THE INVENTION

A booster compressor includes inlet guide vanes supported from a shroud. A shell surrounds the shroud and defines a manifold. A splitter nose includes a groove receiving a forward tang of the shroud with a clearance therebetween defining an outlet for the manifold. Hot air is channeled through the manifold and out the splitter nose for deicing thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
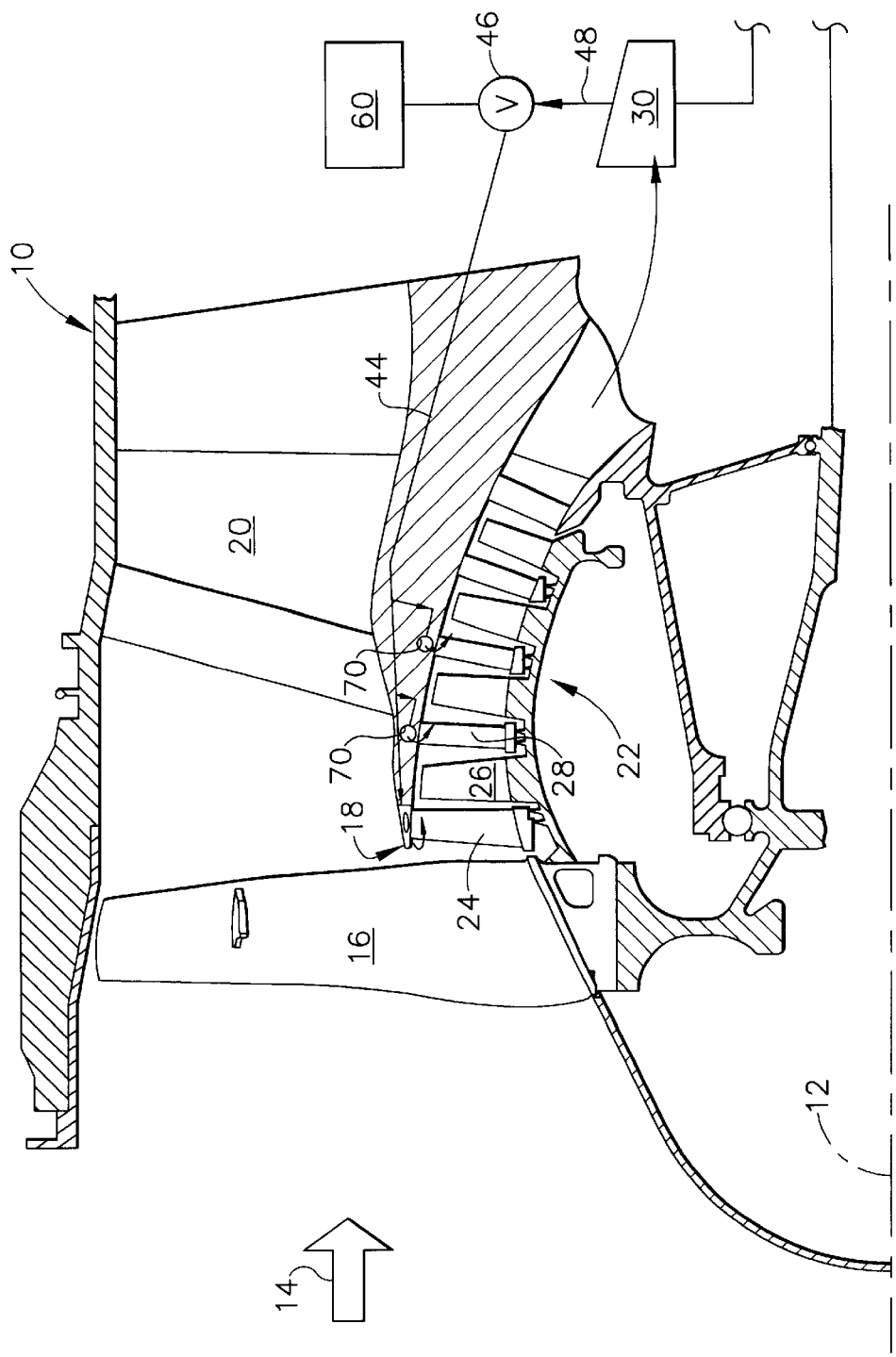
FIG. 1 is an axial sectional view through a portion of a high bypass turbofan gas turbine engine for powering an aircraft in flight, and includes a booster compressor with a deicer system therefor.

Illustrated in FIG. 1 is a portion of a high bypass turbofan gas turbine engine 10 configured for powering an aircraft (not shown) in flight from takeoff, cruise at altitude, descent, and landing, within a corresponding flight envelope of operation. The engine is axisymmetrical about a longitudinal or axial centerline axis 12 and includes an inlet at its forward end for receiving ambient air 14 which first engages a row of relatively large fan rotor blades 16.

Air discharged from the fan blades is split concentrically by an annular splitter nose 18 for separate flow through an annular bypass duct 20 surrounding the splitter, and low pressure or booster compressor 22 disposed inside the splitter.

The basic engine configuration illustrated in FIG. 1 is conventional, and but for the present invention, has been used in commercial service in this country for many years. The bypass duct 20 is surrounded by a conventional nacelle, shown in part, and supported by rows of struts and bypass outlet guide vanes.

The booster compressor 22 includes a row of inlet guide vanes (IGVs) 24 which first receive the inner portion of the air discharged from the fan blades for entry in the compressor. The IGVs are followed in turn by alternating rows or stages of compressor blades 26 and stator vanes 28 which compress the ambient air for discharge into a high pressure compressor 30 for further pressurization thereof.

The high pressure compressor is a conventional multi-stage axial compressor having substantially more stages than the booster compressor for pressurizing the air to a suitable pressure which is then mixed with fuel and ignited in combustor (not shown) for generating hot combustion gases which are channeled to high and low pressure turbines (not shown) for energy extraction therefrom. The low pressure turbine powers the fan and booster compressor, and the high pressure turbine powers the high pressure compressor in a conventional configuration.

Figure 2:
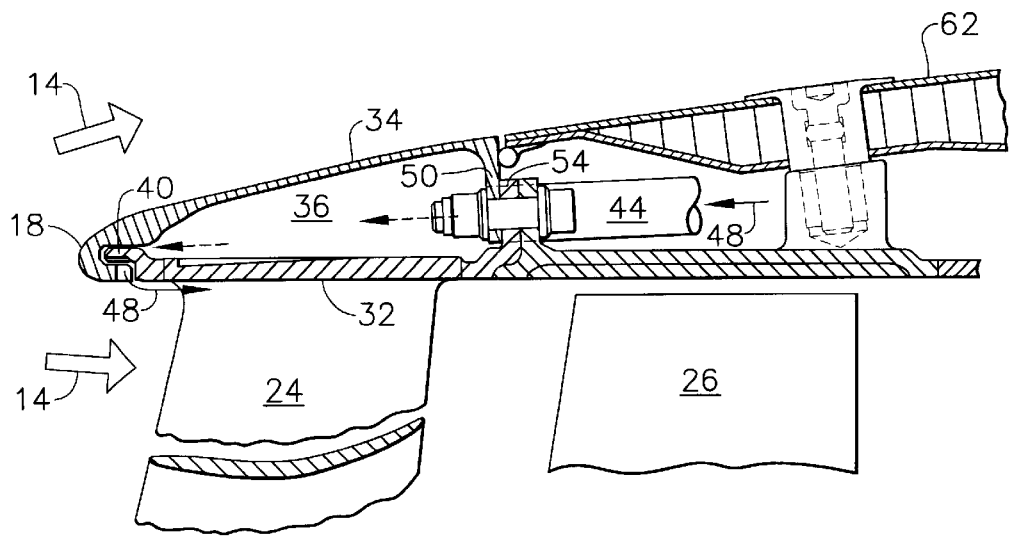
FIG. 2 is an enlarged, axial sectional view through the splitter between the booster compressor and fan bypass duct illustrated in FIG. 1 showing a portion of the deicer system therein.

FIG. 2 illustrates in more particularity a portion of the booster compressor at the splitter nose 18. The IGVs 24 are preferably fixedly mounted to and supported from a surrounding annular shroud 32, which vanes are not adjustable in this exemplary embodiment. The radially inner ends of the row of IGVs are suitably mounted in an inner band as shown in FIG. 1.

As indicated above in the Background section, the splitter nose 18 and leading edges of the IGVs 24 are subject to icing from moisture carried with the fan air 14 during certain icing conditions in the flight envelope. Typically, icing conditions occur at altitudes below 24,000 feet with air temperature below freezing. In such operating conditions, ice may form and accumulate on the nose and IGVs, but for the introduction of the present invention.

More specifically, a deicing system is introduced into the splitter region of the booster compressor for reducing, eliminating, or preventing the accumulation of ice during icing conditions within the flight envelope of the engine. As shown in FIG. 2, an annular shell 34 surrounds the shroud 32 to define an annular plenum or manifold 36. As shown in more detail in FIG. 3, the splitter nose 18 includes a circumferentially extending annular groove 38 which faces axially aft. Correspondingly, the shroud 32 includes a circumferentially extending forward tang or hook 40 which projects axially forwardly and is disposed or trapped in the nose groove 38 with a suitable clearance therebetween defining an nose outlet 42 for the manifold.

As initially illustrated in FIG. 1, means including one or more bleed conduits 44 and cooperating valve 46 are disposed in flow communication between the high pressure compressor 30 and the manifold 36 illustrated in FIG. 2 for channeling hot bleed air 48 into the manifold for deicing the splitter nose 18 and adjacent components. In this way, hot compressor air may be channeled into the splitter region of the booster compressor for reducing or eliminating build up of ice along its external surfaces, as well as removing ice previously accumulated without hot air operation.

A particular advantage of this deicing system is that the IGVs 24 may remain aerodynamically thin and solid, without the need for channeling the hot bleed air radially therethrough. As indicated above in the Background section, maximum aerodynamic efficiency of the IGVs 24 may be obtained by optimizing their aerodynamic configuration which typically requires a relatively thin profile or thickness thereof that would not be otherwise possible if internal passages were provided therein for anti-icing purposes. The introduction of the manifold 36 surrounding the shroud 32 permits local heating of the splitter region of the booster compressor for deicing or anti-icing operation when desired which substantially reduces the introduction of icing during operation.

Figure 4:
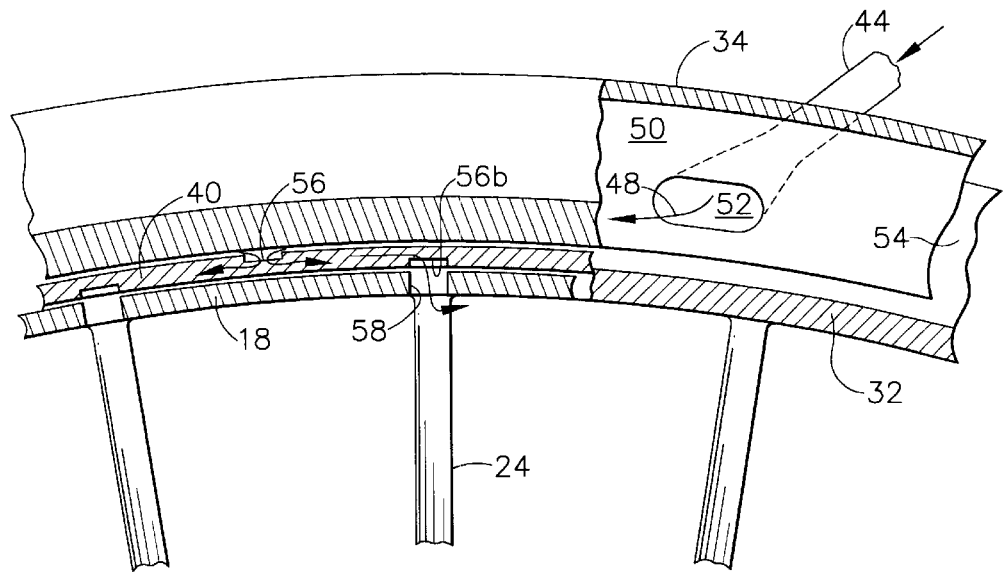
FIG. 4 is a forward-to-aft facing view of a portion of the splitter nose illustrated in FIG. 3 and taken along line 4—4 illustrating inlets and outlets of the deicer system in accordance with an exemplary embodiment.

As shown in FIG. 2 the shell 34 includes a radial aft flange 50 at its proximal or aft end including one or more inlets 52 as shown in FIG. 4 to which the respective bleed conduits 44 are suitably attached. In this way, the hot air 48 is channeled through the conduits 44 into the manifold 36 in forward flow over the shroud 32 for discharge through the splitter nose at the outlet 42 provided thereat.

Correspondingly, the shroud 32 illustrated in FIGS. 2 and 4 includes a radial aft flange 54 fixedly and sealingly joined to the shell aft flange 50. For example, the two mating flanges may simply have a flat abutting interface therebetween clamped together by a row of axial bolt fasteners.

In the preferred embodiment illustrated in FIG. 2, the splitter shell 34 is integrally formed with the splitter nose 18 in a unitary or one-piece, 360 degrees annular member which defines with the cooperating shroud 32 the aerodynamic splitter for diverting the fan air 14 both inside the booster compressor past the IGVs 24 and outside the booster compressor through the fan bypass duct.

This externally exposed splitter shell 34 with its radially inwardly extending aft flange 50 has a general L-configuration in axial section and is spaced radially outwardly from the shroud 32 to define the annular manifold 36. The manifold 36 may extend continuously for 360 degrees around a circumference of the shroud 32, or may include one or more circumferentially spaced apart baffles (not shown) which may be used for tailoring the circumferential temperature distribution of the splitter during deicing operation if desired.

Figure 3:
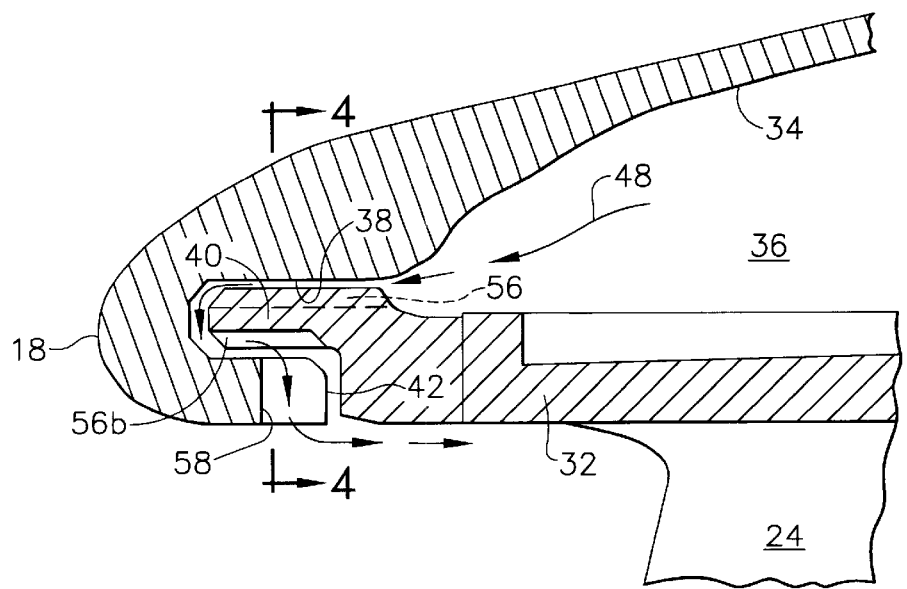
FIG. 3 is an enlarged portion of the splitter nose illustrated in FIG. 2 showing discharge of heating air through the splitter nose.

As shown in FIGS. 3 and 4, the forward tang 40 preferably includes a plurality of circumferentially spaced apart axial slots 56 which increase the flow area of the outlet 42 defined between the tang and nose groove 38.

Correspondingly, the splitter nose 18 preferably includes a plurality of radial slots 58 circumferentially spaced apart from each other and disposed below the shroud tang 40 for similarly increasing the flow area of the outlet 42.

The axial slots disposed through the shroud tang 40 are preferably arranged in two rows of outer slots 56 disposed outboard or around the outer diameter of the tang, and inner slots, designated 56b, disposed inboard along the inner diameter of the tang. The outer slots 56 are preferably circumferentially offset between respective pairs of the inner slots 56b as shown in FIG. 4.

As also illustrated in FIG. 4, the inboard slots 56b are preferably circumferentially aligned with respective ones of the radial slots 58 for effecting a relatively large outlet slot directed radially inwardly. The two rows of axial slots 56,56b ensure that notwithstanding the closeness of the tang-and-groove connection of the shroud and splitter nose, sufficient outlet flow area is provided for discharging the hot air through the splitter nose and back into the booster compressor flowpath.

The flow area of the outer slots 56 is preferably less than that of the downstream portion of the clearance outlet 42, including the inner slots 56b and radial slots 58, to maximize pressure drop across those outer slots. In this way the outer slots will create high velocity impingement jets of the hot air for increasing heat transfer thereof, and increasing heating of the splitter nose from behind.

Also in the preferred embodiment, the inlets 52 provide a metered flow through the manifold 36. The flow area of the inlets 52 is substantially less than that of the outlet 42, including the slots defined thereat. In this way the flow rate through the outlet 42 is substantially independent of the manufacturing and assembly tolerances thereof.

As shown in FIGS. 3 and 4, the radial slots 58 are preferably aligned circumferentially with respective leading edges of the corresponding IGVs 24. In this way, the hot bleed air may be used for not only heating the splitter and its nose but also heating the junction between each IGV and its supporting shroud. Deicing and anti-icing of the radially outer portions of the IGVs may be obtained without channeling the hot air radially through the inside of those vanes.

Accordingly, by the simple introduction of the splitter manifold 36 defined between the splitter shell 34 and the IGV shroud 32, effective deicing capability may be introduced locally in the available space provided by the splitter.

As shown in FIG. 1, the channeling means further includes an electrical controller 60, such as the conventional engine controller, which is additionally configured for controlling the valve 46 for bleeding the hot air 48 to the splitter manifold only when required during the icing conditions. The valve 46 is normally closed during most engine operation, and is opened only as required for deicing operation as the flight conditions require. Deicing is typically required at altitudes below 24,000 feet and with temperature of the incoming air 14 below freezing. Deicing is particularly useful during ground idle, takeoff, and landing.

The preferred embodiment illustrated in FIG. 2 is particularly effective for heating the splitter shell 34, nose 18, and outboard leading edge regions of the individual IGVs 24. The hot air 48 may be bled from any suitable stage of the high pressure compressor, such as the seventh interstage region thereof in which the compressor air is heated to about 400 degrees F. at low power operation, and reaches about 1000 degrees F. at high power operation.

In the event of malfunction of the control valve 46 which might remain open at all times including high power operation, the excessively hot bleed air will not damage the splitter assembly since the air is discharged through the outlet 42 and mixed with the relatively cold ambient air 14 entering the booster compressor. The splitter shell and nose may be formed of suitable metal for withstanding the intended temperature of the hot bleed air. And, the typical acoustic liner or skin 62 disposed aft from the splitter shell 34 is protected from the hot temperature of the bleed air by physical separation therefrom.

Figure 5:
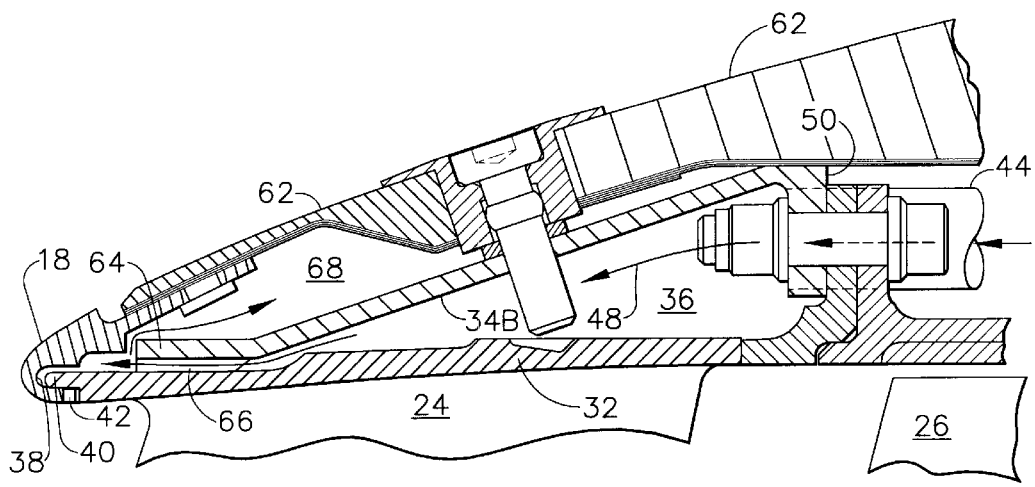
FIG. 5 is an axial sectional view, like FIG. 2, of the splitter having a deicer system in accordance with another embodiment of the present invention.

Whereas the splitter shell 34 illustrated in FIG. 2 defines the external, aerodynamic skin of the splitter within the bypass duct, FIG. 5 illustrates an alternate embodiment in which the shell, designated 34B, is an internal shell disposed inside the leading edge portion of the surrounding splitter skin 62. The skin is suitably attached to aft portion of the splitter nose 18, by suitable fasteners for example.

The internal shell 34B includes a forward or distal end 64 which is opposite to its aft flange 50 at the proximal end thereof. The internal shell concentrically surrounds the IGV shroud 32 to define the annular manifold 36 therein. The forward end 64 of the internal shell is spaced aft from the splitter nose 18 and surrounds the shroud with a suitable clearance to define an internal outlet 66 disposed in flow communication with the nose outlet 42.

The splitter skin 62 is preferably spaced radially outwardly from the shell 34B to define an annular purge outlet 68 disposed in flow communication with the internal outlet 66 for discharging a portion of the hot bleed air from the internal manifold 36.

In this embodiment, the splitter nose 18 similarly includes the radial slots defining a portion of the outlet 42. And, the internal outlet 66 is defined by a plurality of circumferentially spaced apart, axial slots disposed in the inner surface of the shell forward end 64.

The internal shell 34B preferably converges from its aft flange 50 to its forward end 64, with the outlet slot 66 facing the back of the splitter nose 18 for impingement heating thereof by the hot bleed air 48 directed through the outlet 66.

A portion of the air discharged from the manifold 36 flows between the tang 40 in its groove 38 for discharge from the outlet 42 to join the ambient air flowing into the booster compressor past the IGVs 24. The remaining portion of the hot air is discharged through the outlet 66 and is channeled aft through the annular purge outlet 68 inside the skin 62. This portion of the hot air may be discharged into the fan bypass duct through slots or apertures specifically configured therefor.

The embodiment illustrated in FIG. 5 provides heating for the acoustic skin 62 as well as the splitter nose for deicing thereof. And, this embodiment provides an alternate internal outlet for the manifold 36 in the event the external outlet 42 becomes plugged with ice. However, as the splitter nose is heated during deicing operation, any plugging of the external outlet 42 will eventually be melted for resuming normal two-outlet operation of the deicing system.

In both embodiments described above hot air bled from the high pressure compressor is routed to the splitter assembly surrounding the inlet of the booster compressor. The splitter is heated during icing conditions, with the hot air being discharged at least through the joint between the shroud and splitter nose.

If desired, one or more annular manifold rings 70 may surround the second and third stage stators of the booster compressor illustrated in FIG. 1, and are operatively joined to the bleed conduits 44. The two rings 70 illustrated may be used individually or together, and preferably in combination with the deicing manifold at the splitter nose 18.

The individual rings 70 have suitable outlets preferably aligned with the leading edges of the respective stator vanes for discharging the hot bleed air inside the surrounding shrouds thereof. In this way, additional deicing or anti-icing may be effected at the second and third rows of stator vanes inside the booster compressor wherein the tendency for ice accumulation is substantially lower than that experienced at the entrance to the booster compressor itself In the various embodiments disclosed above, the booster IGVs and stator vanes may be optimized for maximum aerodynamic performance, and are preferably solid metal with the aerodynamic thinnest profile therefor. Deicing is effected at the surrounding splitter and the intersection thereof with the outer ends of the IGVs. Substantial deicing capability may be effected, without otherwise decreasing aerodynamic performance of the booster compressor.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A booster compressor comprising:

a row of solid inlet guide vanes supported from an annular shroud, and followed by alternating stages of rotor blades and stator vanes;

an annular shell surrounding said shroud and defining a manifold;

a splitter nose including an aft facing groove, and said shroud includes a forward tang disposed in said groove with a clearance therebetween defining an outlet for said manifold; and means for channeling hot air into said manifold for deicing said splitter nose.

2. A booster compressor comprising:

a row of inlet guide vanes supported from an annular shroud, and followed by alternating stages of rotor blades and stator vanes;

an annular shell surrounding said shroud and defining a manifold, and said shell includes an aft flange including an inlet for receiving said hot air for forward flow over said shroud;

a splitter nose including an aft facing groove, and said shroud includes a forward tang disposed in said groove with a clearance therebetween defining an outlet for said manifold; and means for channeling hot air into said manifold for deicing said splitter nose.

3. A compressor according to claim 2 wherein said shroud includes an aft flange sealingly joined to said shell aft flange.

4. A compressor according to claim 3 wherein said tang includes a plurality of slots for increasing flow area of said outlet.

5. A compressor according to claim 3 wherein said splitter nose includes a plurality of radial slots disposed below said tang for increasing flow area of said outlet.

6. A compressor according to claim 3 wherein:

said tang includes a plurality of axial slots for increasing flow area of said outlet; and said splitter nose includes a plurality of radial slots disposed below said tang for increasing flow area of said outlet.

7. A compressor according to claim 6 wherein said axial slots include outer slots disposed outboard said tang and inner slots disposed inboard said tang.

8. A compressor according to claim 7 wherein said inboard slots are circumferentially aligned with said radial slots.

9. A compressor according to claim 8 wherein said outboard slots are circumferentially offset between respective ones of said inboard slots.

10. A compressor according to claim 6 wherein said radial slots are aligned with respective leading edges of said vanes.

11. A compressor according to claim 6 wherein said channeling means are disposed in flow communication with a high pressure compressor disposed aft from said booster compressor for bleeding interstage compressed air therefrom.

12. A compressor according to claim 11 wherein said channeling means comprise a valve in a bleed conduit between said high pressure compressor and said manifold.

13. A compressor according to claim 12 wherein said channeling means are configured for selectively opening said valve for deicing said splitter nose and otherwise closing said valve.

14. A compressor according to claim 13 wherein said shell is integrally formed with said splitter nose for defining a splitter to divert fan air inside and outside said booster compressor.

15. A compressor according to claim 14 wherein said splitter nose and shell comprise a unitary annular member.

16. A compressor according to claim 15 wherein said shell is spaced radially outwardly from said shroud to define an annular manifold.

17. A compressor according to claim 3 wherein said inlet guide vanes are solid and aerodynamically thin.

18. A compressor according to claim 3 wherein said shell further includes a forward end spaced aft from splitter nose, and concentrically surrounding said shroud to define an internal outlet disposed in flow communication with said nose outlet.

19. A compressor according to claim 18 further comprising a splitter skin fixedly joined to an aft end of said splitter nose, and surrounding said shell.

20. A compressor according to claim 19 wherein said skin is spaced radially outwardly from said shell to define a purge outlet disposed in flow communication with said internal outlet for discharging a portion of said hot air from said manifold.

21. A booster compressor comprising:

an annular shroud including a forward tang at a forward end, and an aft flange at an opposite aft end;

a row of inlet guide vanes supported from said shroud, and followed by alternating stages of rotor blades and stator vanes;

an external splitter shell surrounding said shroud to define a manifold, and having a splitter nose at a forward end and an aft flange at an opposite aft end sealingly joined to said shroud aft flange;

said splitter nose including an aft facing groove receiving said shroud forward tang with a clearance therebetween defining an outlet for said manifold; and means including an inlet disposed in said shell aft flange for channeling hot air into said manifold for forward flow over said shroud.

22. A compressor according to claim 21 wherein:

said tang includes rows of outer and inner slots disposed on radially opposite sides thereof for increasing flow area of said outlet; and said splitter nose includes a row of radial slots disposed below said tang for increasing flow area of said outlet.

23. A compressor according to claim 22 wherein:

said radial slots are aligned with respective leading edges of said vanes, and circumferentially aligned with said inner slots; and said outboard slots are circumferentially offset between respective ones of said inboard slots, with less flow area for generating jets of said hot air for impingement heating said nose.

24. A compressor according to claim 23 wherein said channeling means comprise a valve disposed in a bleed conduit in flow communication with a high pressure compressor disposed aft from said booster compressor for bleeding interstage compressed air therefrom for flow into said manifold.

25. A booster compressor comprising:

an annular shroud including a forward tang at a forward end, and aft flange at an opposite aft end;

an internal shell surrounding said shroud to define a manifold therebetween, and said shell includes a forward end concentrically surrounding said shroud to define an internal outlet therebetween, and an aft flange at an opposite aft end thereof sealingly joined to said shroud aft flange;

a splitter nose including an aft facing groove, and said shroud forward tang is disposed in said groove with a clearance therebetween defining an outlet for said manifold;

a splitter skin fixedly joined to an aft end of said splitter nose, and surrounding said internal shell; and means including an inlet in said aft flange of said shell for channeling hot air into said manifold for deicing said splitter nose.

26. A compressor according to claim 25 wherein said skin is spaced radially outwardly from said shell to define a purge outlet disposed in flow communication with said internal outlet for discharging a portion of said hot air from said manifold.

27. A compressor according to claim 26 wherein said shell forward end includes a row of axial slots on an inner surface thereof defining said internal outlet.

28. A compressor according to claim 27 wherein said splitter nose includes a plurality of radial slots disposed below said tang for increasing flow area of said outlet.

29. A compressor according to claim 28 wherein said shell converges from said aft flange to said forward end thereof.

* * * * *